United States Patent
Smith (10) Patent No.: US 12,404,750 B2
(45) Date of Patent: Sep. 2, 2025

(54) SYSTEMS AND METHODS FOR DOWNHOLE POWER GENERATION

(71) Applicant: Schlumberger Technology Corporation, Sugar Land, TX (US)

(72) Inventor: Nicholas H. Smith, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/560,203

(22) PCT Filed: May 9, 2022

(86) PCT No.: PCT/US2022/072210
§ 371 (c)(1),
(2) Date: Nov. 10, 2023

(87) PCT Pub. No.: WO2022/241401
PCT Pub. Date: Nov. 17, 2022

(65) Prior Publication Data
US 2024/0243641 A1 Jul. 18, 2024

Related U.S. Application Data

(60) Provisional application No. 63/186,320, filed on May 10, 2021.

(51) Int. Cl.
*E21B 41/00* (2006.01)
(52) U.S. Cl.
CPC ................................ *E21B 41/0085* (2013.01)
(58) Field of Classification Search
CPC ... H02K 7/1823; E21B 41/0085; E21B 47/18; H02P 9/04; H02P 9/48
See application file for complete search history.

(56) References Cited

U.S. PATENT DOCUMENTS

| | | | |
|---|---|---|---|
| 10,947,819 B2 | 3/2021 | Guven | |
| 2006/0066287 A1* | 3/2006 | Obayashi | H02P 9/48 322/25 |
| 2011/0050184 A1 | 3/2011 | Said | |
| 2016/0333670 A1* | 11/2016 | Tegeler | E21B 47/18 |
| 2018/0183377 A1 | 6/2018 | McMullen | |

FOREIGN PATENT DOCUMENTS

| | | |
|---|---|---|
| EP | 0500303 A2 | 8/1992 |
| WO | 2010019896 A2 | 2/2010 |

OTHER PUBLICATIONS

International Preliminary Report on Patentability issued in International Patent application PCT/US2022/072210, dated Nov. 23, 2023. 7 pages.
International Search Report and Written Opinion issued in International Patent application PCT/US2022/072210 on Aug. 26, 2022, 9 pages.

* cited by examiner

*Primary Examiner* — Julio C. Gonzalez
(74) *Attorney, Agent, or Firm* — Jeffrey D. Frantz (57) ABSTRACT

A downhole power generation system includes a generator that generates AC input power having a variable input voltage that varies based on a rotational rate of a turbine, which in turn is based on a variable flow rate of a fluid flow. An active rectifier converts the AC power having the variable input voltage to DC power having a constant output voltage. This may increase the range of usable input voltages and decrease a number of flow kits used in a downhole drilling assembly.

14 Claims, 6 Drawing Sheets

SYSTEMS AND METHODS FOR DOWNHOLE POWER GENERATION

CROSS-REFERENCE TO RELATED APPLICATIONS

This application is a national stage entry under 35 U.S.C. 371 of International Application No. PCT/US2022/072210, entitled "SYSTEMS AND METHODS FOR DOWNHOLE POWER GENERATION," filed May 9, 2022, which claims the benefit of U.S. Provisional Application No. 63/186,320, entitled "SYSTEMS AND METHODS FOR DOWNHOLE POWER GENERATION," filed May 10, 2021, the disclosure of which is hereby incorporated herein by reference.

BACKGROUND OF THE DISCLOSURE

Downhole drilling operations are used to perform exploration and/or extract oil, natural gas, and other resources from underground formations. Many downhole drilling operations utilize specialized downhole tools. Some downhole tools utilize electrically powered devices, instruments, sensors, processors, and so forth. Electric power may be generated downhole using a downhole generator to power the downhole tools. The generator may generate alternating current (AC) power, which may then be converted to direct current (DC) power using a rectifier.

SUMMARY

In some embodiments, a downhole power generation system includes a generator configured to generate AC input power having a variable input voltage from a variable fluid flow. An active rectifier receives the AC input power and converts it to DC output power having a constant output voltage. In some embodiments, the constant output voltage is greater than the input voltage. In some embodiments, an automatic startup uses the generated AC power to start up and provide power to the active rectifier.

In some embodiments, a method for generating downhole power includes generating AC input power having a first input voltage. The AC input power is generated from a first fluid flow having a first flow rate. The AC input power having the first input voltage is converted to DC output power with a constant output voltage. In some embodiments, the AC input power is generated with a second input voltage based on a second fluid flow having a second flow rate. The active rectifier converts the AC input power to the DC output power having the constant voltage.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3-1 through FIG. 3-3 are representations of charts representing elements of a downhole power generation system, according to at least one embodiment of the present disclosure;

DETAILED DESCRIPTION

This disclosure generally relates to devices, systems, and methods for generating a constant DC voltage downhole using variable AC input power and variable input voltage. A downhole generator includes an impeller rotated by drilling fluid. The voltage of the AC input power is determined based on a rotational rate of the impeller, which in turn is based on a flow rate of the drilling fluid. As the flow rate of the drilling fluid changes during drilling operations, the AC input power and voltage may change. The AC input power may be converted to DC output power having a constant output voltage using a sensorless active rectifier over a wide range of AC input voltages without damaging downhole electronics. By using an active rectifier to generate a constant output voltage, a flow kit having a single impeller may be used across a broad range of flow rates. This may reduce downtime due to tripping the generator out to switch out flow kits based on an anticipated change of flow rate.

Figure 1:
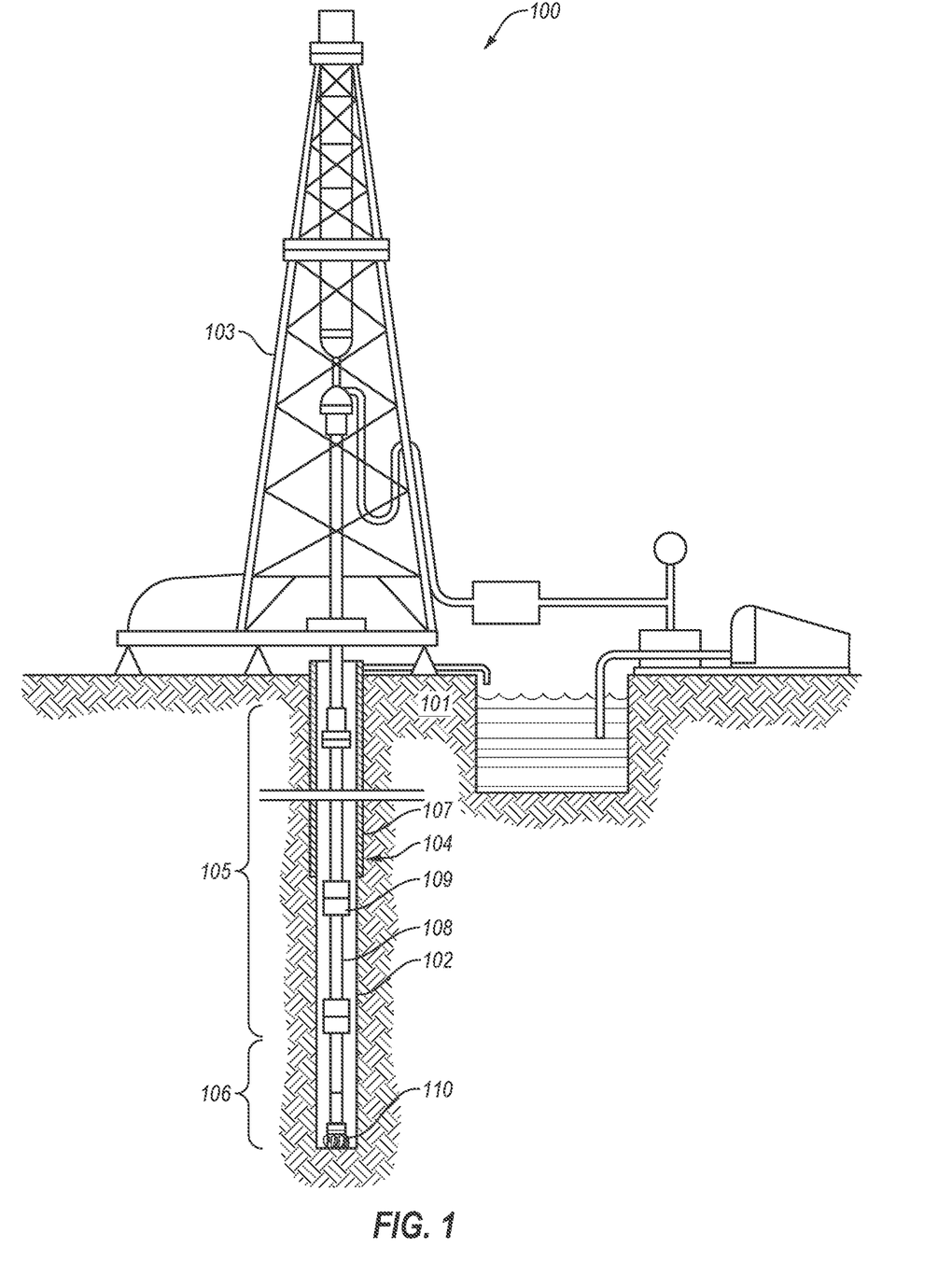
FIG. 1 is a representation of a drilling system, according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore. At least a portion of the RSS may maintain a geostationary position relative to an absolute reference frame, such as gravity, magnetic north, and/or true north or a portion of the RSS may maintain stationary relative to another reference, e.g., the collar and drill string. Using measurements obtained with the geostationary position, the RSS may locate the bit 110, change the course of the bit 110, and direct the directional drilling tools on a projected trajectory.

Components of the BHA 106 may use electric power to operate. The BHA 106 may include a downhole generator which provides power to components of the BHA. The downhole generator may generate AC power, which an active rectifier converts to DC power. The voltage and wattage of the AC power generated is based on a fluid flow of the drilling fluid. Because the fluid flow may vary based on a specific drilling operation, the voltage and wattage of the generated AC power may be variable. An active rectifier connected to the variable AC power input may convert the AC power to DC power with a constant output voltage. This may help to provide the downhole components with DC power having a consistent output voltage.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface, or may be allowed to fall downhole.

Figure 2:
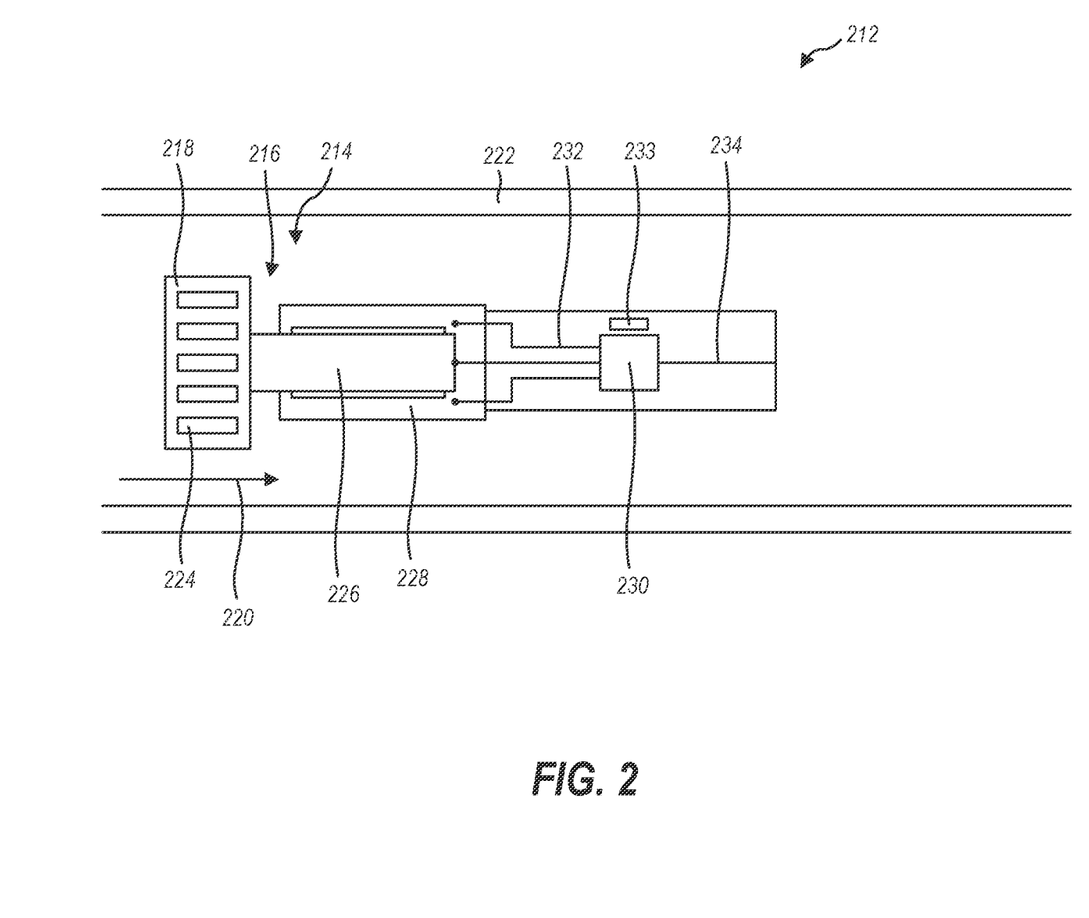
FIG. 2 is a representation of a downhole power generation system, according to at least one embodiment of the present disclosure.

FIG. 2 is a representation of a downhole power generation system 212, according to at least one embodiment of the present disclosure. The downhole power generation system 212 includes a generator 214 having a turbine 216 rotated by an impeller 218. A fluid flow 220 flowing through a housing 222 in which the generator 214 is located impacts one or more blades 224 on the impeller 218, thereby causing the impeller 218 to rotate. The turbine 216 includes a rotor 226 rotationally fixed to the impeller 218 that rotates with the same rotational speed as the impeller 218. The rotor 226 rotates within a stator 228. Rotation of the rotor 226 relative to the stator 228 may generate electricity. The electricity generated by the generator 214 may be 3-phase alternating current (AC) power. The amount of power generated by the generator 214 may be determined at least in part by the rotational rate of the rotor 226 combined with an angle of the blades 224 of the impeller 218. In some embodiments, the voltage generated by the generator 214 may be dependent upon the rotational rate of the rotor 226. For example, a higher rotational rate may result in a higher voltage, and a lower rotational rate may result in a lower voltage.

In some embodiments, the generator 214 may power one or more downhole tools (such as tools that are part of the BHA 106 of FIG. 1). At least one of the downhole tools may be configured to operate using direct current (DC) power. Thus, to provide power to the DC-powered downhole tools, the generated 3-phase AC power from the generator 214 may be rectified to DC power.

Conventionally, the AC power is rectified using a passive rectifier and a DC-to-DC voltage converter to convert the rectified DC voltage to the operating voltage. A field coil may be connected to the generator 214 to regulate the input AC voltage of the generated AC power. Regulating the input AC voltage may help to protect the electronics downstream of the generator 214. For example, reducing the input AC voltage may help to prevent electronics downstream from burning out based on the high input AC voltage. However, regulating the input AC voltage with a field coil may reduce the range of rotational rates of the turbine 216 to generate a usable amount of power. This in turn may reduce the range of flow rates of the fluid flow 220 used to generate the usable amount of power. However, downhole drilling operations occur over a wide range of flow rates, which may generate a variable fluid flow. Conventionally, to generate usable power over a wide range of flow rates, a drilling operator may have multiple "flow kits," or combinations of impellers 218 and their associated hardware, which have blades 224 that are optimized for a flow range, such as high flow, medium flow, and low flow. However, switching between flow kits involves tripping the downhole power generation system 212 out of the hole, switching out the flow kit, and tripping the downhole power generation system 212 back into the hole. This may take a significant amount of time, increases inventory management complexity, and decreases equipment utilization, thereby increasing costs and reducing the overall rate of penetration or other drilling efficiency metric for a wellbore.

In accordance with embodiments of the present disclosure, an active rectifier 230 may be connected to an AC input power 232. The active rectifier 230 may convert the AC input power 232 to DC output power 234. By using an active rectifier 230, the DC output power 234 may have a constant output voltage, regardless of the input voltage and/or power of the AC input power 232. In this manner, the AC input power 232 generated by the generator 214 may be unregulated by a field coil (e.g., the generator 214 does not include a field coil). Put another way, the generator 214 may provide AC input power 232 to the active rectifier 230 without one or more field coils regulating the generated AC input power. Field coils may add length to the generator 214. Thus, embodiments of the present disclosure may help to reduce the length of the generator 214.

In some embodiments, the active rectifier 230 may be sensorless. For example, the active rectifier 230 may convert the AC input power 232 to the DC output power 234 having the constant voltage without any input, analysis, or other feedback from one or more sensors connected to the downhole power generation system 212. The active rectifier 230 may include one or more MOSFETs, diodes, switches, and other elements that may automatically convert the AC input power 232 to DC output power 234 having the constant DC voltage. Sensorless active rectification may simplify the installation and operation of the downhole power generation system 212.

In some embodiments, the active rectifier 230 may be controlled by a power controller 233. The controller 233 may include one or more processors that provide instructions to the active rectifier 230 to convert the AC input power to DC output power having the constant voltage. The controller 233 may receive information from the AC input power 232. For example, the controller 233 may be in communication with a sensor (such as a voltmeter) connected to the AC input power 232. The sensor may sense information related to the generator and provide the controller 233 with information related to the AC input power 232, such as AC input voltage, wattage, current, or any other information about the AC input power 232. In some embodiments, using the information received from the sensor (e.g., the sensed variable input voltage), the controller 233 may regulate the active rectifier 230, such as by activating or deactivating MOSFETs within the active rectifier 230, to convert the AC input power 232 to DC output power 234 having the constant output voltage. This may help the controller to quickly adjust elements of the active rectifier 230, thereby maintaining a constant DC output voltage.

In some embodiments, the active rectifier 230 may not include any DC to DC voltage adjustments. For example, the active rectifier 230 may not include a DC to DC voltage regulator. In some embodiments, the active rectifier 230 may not include any sensors that measure the output DC voltage. The output DC voltage may be determined by the operator and programmed into the active rectifier 230. In some embodiments, the output DC voltage may not be changed during operation or while the downhole power generation system 212 is downhole. This may simplify the construction and operation of the downhole power generation system 212. This may further improve the reliability of the downhole power generation system 212 by reducing the number of parts and/or sensors that may fail in the downhole environment.

In some embodiments, the controller 233 may receive information from other sensors within the downhole power generation system 212. For example, the controller 233 may receive information about the rotational rate (e.g., RPM of the impeller 218) and/or information about the flow rate of the fluid flow 220. The controller 233 may process the rotational rate and/or flow rate information in concert with or as an alternative to the AC input voltage information to adjust the active rectifier 230 to maintain the constant DC output voltage. Using rotational rate and/or flow rate information may help the controller 233 to more actively or proactively adjust the active rectifier 230 to maintain the constant DC voltage with little variation.

FIG. 3-1 is a representation of a voltage chart 336 depicting voltage over time of a downhole power generation system. FIG. 3-2 is a representation of an RPM chart 338 depicting RPM of a turbine of a generator over time. FIG. 3-3 is a representation of a GPM chart 340 depicting flow rate (in gallons per minute (GPM)). The charts 336, 338, and 340 may be representations of conditions at a downhole power generation system, such as the downhole power generation system 212 of FIG. 2. The charts 336, 338, 340 are stacked vertically on top of each other across the same time scale, with time on the horizontal axis, to allow for convenient comparison of various conditions at the downhole power generation system at a given time. However, it should be understood that the charts 336, 338, 340 are illustrative, and that other conditions of the downhole power generation system may be present at any given time.

Figure 31:
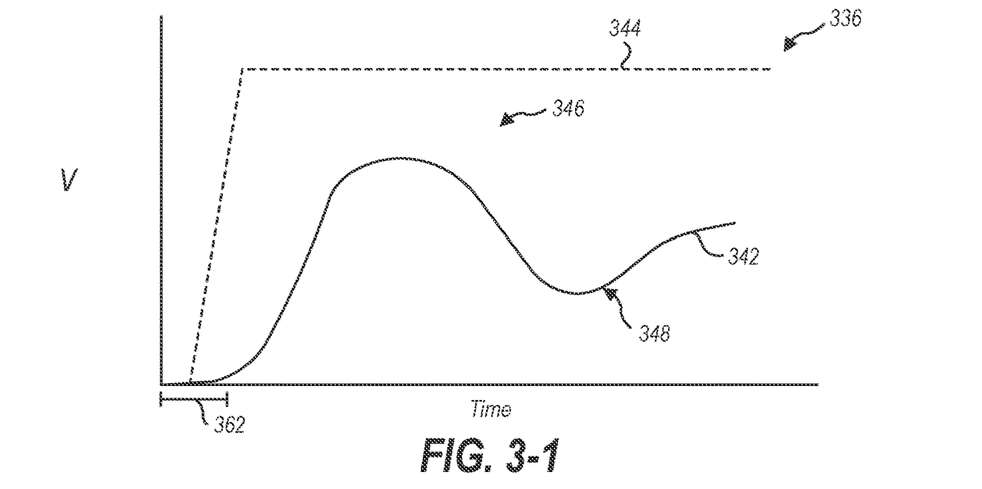

The voltage chart 336 of FIG. 3-1 provides a representation of the generated AC input voltage 342 from the generated AC input power (e.g., the AC input power 332 of FIG. 2). Included on the voltage chart 336 is the DC output voltage 344 from the converted DC output power (e.g., the DC output power 234 of FIG. 2). As may be seen, AC input voltage 342 may be variable (e.g., a variable input voltage). Nevertheless, the active rectifier may rectify the variable AC input voltage 342 to a constant DC output voltage 344. Put another way, whether the AC input voltage 342 is a maximum input voltage 346 or a minimum input voltage 348, the DC output voltage 344 may remain constant.

In some embodiments, the DC output voltage may have a target output voltage, and the actual DC output voltage may vary from the target output voltage by an output voltage variation percentage (e.g., the difference between the actual output voltage and the target voltage output, divided by the target output voltage, and multiplied by 100). In some embodiments, the variation percentage may be in a range having an upper value, a lower value, or upper and lower values including any of 1%, 2%, 3%, 4%, 5%, 6%, 7%, 8%, 9%, 10%, 15%, 20%, or any value therebetween. For example, the variation percentage may be greater than 1%. In another example, the variation percentage may be less than 20%. In yet other examples, the variation percentage may be any value in a range between 1% and 20%. In some embodiments, it may be critical that the variation percentage is less than 5% to provide power having a constant voltage to the downhole tools.

In some embodiments, the DC output voltage 344 may be higher than the maximum input voltage 346. In some embodiments, the maximum input voltage 346 is the maximum voltage that the generator (e.g., the generator 214 of FIG. 2) is configured to generate. The active rectifier may be configured to convert the AC input power to DC output power having the DC output voltage 344 across all AC input voltages that the generator may generate. This may help to generate a reliable and predictable DC output voltage 344 that other downhole tools may use.

Figure 32:
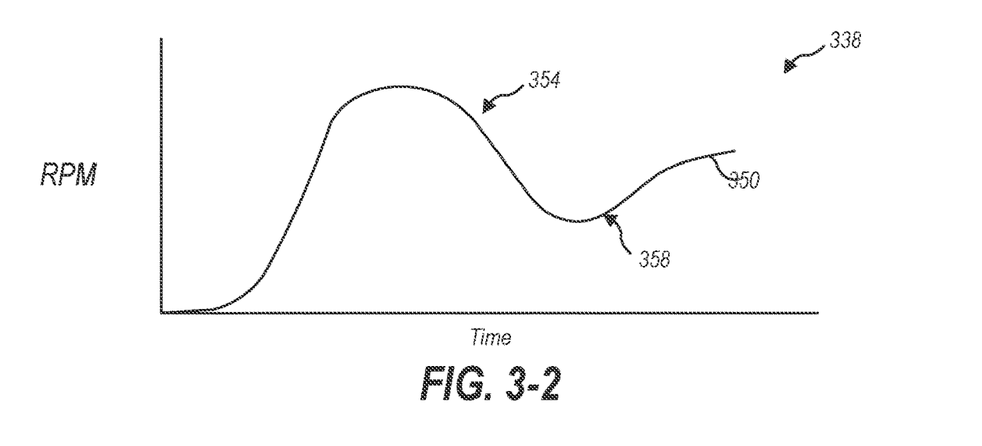

In some embodiments, the AC input voltage 342 may be determined based on a rotational rate of the turbine. As shown in FIG. 3-2, the RPM chart 338 is a representation of the rotational rate 350 in rotations per minute (RPM) of the turbine. As indicated by a comparison between FIG. 3-1 and FIG. 3-2, the AC input voltage 342 is directly related to the rotational rate 350. For example, a high rotational rate 350 may result in a high AC input voltage 342. Similarly, a low rotational rate 350 may result in a low AC input voltage 342.

Figure 33:
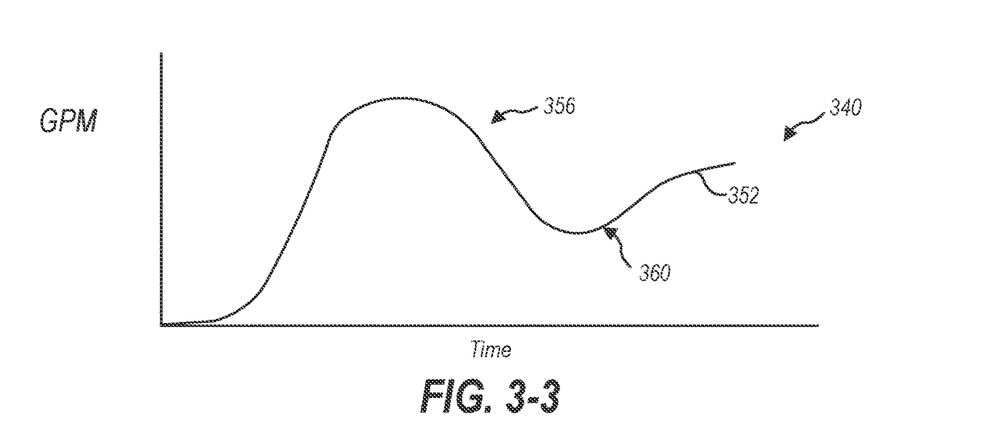

The rotational rate 350 shown in FIG. 3-2 may be related to a flow rate, as shown in the GPM chart 340 of FIG. 3-3. The flow rate 352 in GPM may be selected by an operator based on downhole drilling conditions, downhole drilling activities, downhole drilling tools, any other downhole drilling or operational element, and combinations thereof. For example, the flow rate 352 may be selected based on downhole drilling conditions, such as mud type (e.g., oil based, water based, density, viscosity), formation type (e.g., rock type, rock hardness, rock porosity, and so forth), temperature, any other downhole drilling condition, and combinations thereof. In some embodiments, the flow rate 352 may be selected based on downhole drilling activities such as whether the downhole tool is advancing the wellbore, expanding the wellbore diameter, removing a wellbore element (such as a casing, plug, packer, or other wellbore element), performing a survey, performing any other drilling or operational activity, and combinations thereof. Different drilling conditions and/or different drilling activities may utilize different flow rates. For example, some drilling conditions and/or activities may utilize a high flow rate, a medium flow rate, or a low flow rate.

Conventionally, the turbine and electronic elements of the generator may be able to handle a rotational rate 350 of the impeller that is within a power generation range. If the rotational rate 350 is too high, then the generated power and/or the associated voltage may be too high, resulting in damage to the turbine, associated electronics, any other downhole electronic component, and combinations thereof. To maintain a maximum rotational rate 354 that will not damage the downhole electronic components, a turbine may be selected to generate the maximum input voltage 346 by rotating with the maximum rotational rate 354 within an anticipated flow rate range. Conventionally, as discussed herein, a field coil may be installed on the downhole generator to regulate the AC input voltage 342. However, the field coil may result in a reduced range of rotational rates 350 able to generate a useful input power. To handle a broad flow rate range, a conventional downhole power generation system may include multiple flow kits. Each flow kit may be optimized to maintain the maximum rotational rate 354 for a specific flow rate range.

Downhole power generation systems using an active rectifier of the present disclosure may be used to convert an AC input power having a broad range of AC input voltages to DC output power having a constant DC output voltage 344 without the use of a field coil. The operator may select a turbine, including the impeller and blade angles, that generates the maximum input voltage 346 at a maximum RPM 354 generated from a maximum operational flow rate 356. The maximum operational flow rate 356 may be the maximum flow rate that an operator may utilize for a specific drilling setup. The active rectifier may convert AC input power to DC output power having the constant DC output voltage 344 that is greater than the maximum input voltage 346. Furthermore, in some embodiments, the maximum input voltage 346 may be greater than voltage input regulated by a conventional turbine including a field coil.

Furthermore, because the field coil is not regulating the AC output power, the turbine may generate AC input power having the minimum input voltage 348. The minimum input voltage 348 may be associated with a minimum turbine RPM 358 generated by a minimum flow rate 360. The minimum flow rate 360 may be the minimum operational flow rate for the same drilling setup as the maximum operational flow rate 356. The active rectifier may convert the AC input power having the minimum input voltage 348 to DC output power having the constant DC output voltage 344. Furthermore, in some embodiments, the minimum input voltage 348 may be lower than voltage input regulated by a conventional turbine including a field coil. Thus, using an active rectifier to rectify AC input power having unregulated AC input voltage 342 may increase the range of AC input voltages 342 that may be converted to DC output power having the constant DC output voltage 344. This may increase the range of rotational rates of the turbine that may be used to generate the AC input power and increase the range of flow rates that may be used with the same flow kit. Therefore, a specific drilling setup may utilize fewer flow kits, and may be able to utilize a single flow kit for an entire drilling operation.

In some embodiments, the AC input voltage 342 may be in a range having an upper value, a lower value, or upper and lower values including any of 25 V, 30 V, 40 V, 50 V, 60 V, 70 V, 80 V, 90 V, 100 V, 125 V, 150 V, 175 V, 200 V, 225 V, 250 V, or any value therebetween. For example, the AC input voltage 342 may be greater than 25 V (e.g., the minimum input voltage 348 may be greater than or equal to 25 V). In another example, the AC input voltage 342 may be less than 250 V (e.g., the maximum input voltage 354 may be less than or equal to 250 V). In yet other examples, the AC input voltage 342 may be any value in a range between 25 V and 250 V. In some embodiments, it may be critical that the AC input voltage 342 is between 25 V and 250 V to generate sufficient power to power the downhole tools over an entire flow rate range.

In some embodiments, the constant DC output voltage 344 may be in a range having an upper value, a lower value, or upper and lower values including any of 100 V, 120 V, 140 V, 160 V, 180 V, 200 V, 220 V, 240 V, 250 V, 275 V, 300 V, or any value therebetween. For example, the constant DC output voltage 344 may be greater than 100 V. In another example, the constant DC output voltage 344 may be less than 300 V. In yet other examples, the constant DC output voltage 344 may be any value in a range between 100 V and 300 V. In some embodiments, it may be critical that the constant DC output voltage 344 is greater than the maximum input voltage 346 to convert AC input power to DC output power having a reliable voltage. In some embodiments, the constant DC output voltage 344 may be a multiple of the minimum input voltage 348. For example, the constant DC output voltage 344 may be 2 times, 3 times, 4 times, 5 times, 6 times, 7 times, 8 times, 9 times, 10 times, 15 times, 20 times, or more than the minimum input voltage 348.

In some embodiments, the rotational rate 350 may be in a range having an upper value, a lower value, or upper and lower values including any of 500 RPM, 1,000 RPM, 1,500 RPM, 2,000 RPM, 2,500 RPM, 3,000 RPM, 3,500 RPM, 4,000 RPM, 4,500 RPM, 5,000 RPM, 5,500 RPM, 6,000 RPM, 6,500 RPM, 7,000 RPM, 7,500 RPM, 8,000 RPM, 8,500 RPM, 9,000 RPM, 9,500 RPM, 10,000 RPM, or any value therebetween. For example, the rotational rate 350 may be greater than 500 RPM (e.g., the minimum rotational rate 358 may be greater than 500 RPM). In another example, the rotational rate 350 may be less than 10,000 RPM (e.g., the maximum rotational rate 354 may be less than 10,000 RPM). In yet other examples, the rotational rate 350 may be any value in a range between 500 RPM and 10,000 RPM. In some embodiments, it may be critical that the rotational rate 350 is less than or equal to 6,000 RPM to efficiently generate AC input power with the maximum input voltage 346.

In some embodiments, the flow rate 352 may be in a range having an upper value, a lower value, or upper and lower values including any of 50 GPM, 100 GPM, 150 GPM, 200 GPM, 250 GPM, 300 GPM, 350 GPM, 400 GPM, 450 GPM, 500 GPM, 550 GPM, 600 GPM, 650 GPM, 700 GPM, 750 GPM, 800 GPM, 850 GPM, 900 GPM, 950 GPM, 1,000 GPM, or any value therebetween. For example, the flow rate 352 may be greater than 50 GPM (e.g., the minimum flow rate 360 may be greater than 50 GPM). In another example, the flow rate 352 may be less than 1,000 GPM (e.g., the maximum operational flow rate 356 may be less than (1,000 GPM). In yet other examples, the flow rate 352 may be any value in a range between 50 GPM and 1,000 GPM. In some embodiments, it may be critical that the flow rate 352 over which a single flow kit may be used for a 4.75 inch collar may be between 150 GPM and 400 GPM to generate DC output power having the constant DC output voltage 344 from a single flow kit. In some embodiments, it may be critical that the flow rate 352 over which a single flow kit may be used for a 6.75 inch collar may be between 300 GPM and 800 GPM to generate DC output power having the constant DC output voltage 344 from a single flow kit.

In accordance with embodiments of the present disclosure, the active rectifier and associated control circuits may receive startup power from the AC input power generated by the generator. During startup of drilling operations from no flow to an operational flow, the flow rate may not instantly jump from no flow (e.g., powered off) to operational levels of flow. The flow rate of the drilling fluid has a startup (e.g., rampup) period which is the amount of time it takes for the fluid flow to increase in flow rate. A startup period 362 of the downhole power generation system may be the period of time that it takes for the fluid flow to increase in flow rate and for the active rectifier to power up.

During the startup period 362, the turbine may rotate with a reduced rotational rate, which may result in a low AC input voltage (e.g., around 10 V or less). For low AC input voltages during the startup period 362, the active rectifier may be configured to operate as a passive rectifier. For example, MOSFETs in the active rectifier may be configured to passively rectify the low AC input power at a startup input voltage to a low-voltage DC power with a startup DC output voltage. This low-voltage DC power may be directed to the control circuits of the active rectifier. As the control circuits receive power, they may begin to actively control the active rectifier to increase the DC output voltage. As the turbine continues to increase in rotational rate, the converted DC output power may be used to power the ongoing operation of the active rectifier. This may reduce the need for an external power source, such as a battery. In some embodiments, the downhole power generation system may include a battery to provide power to the active rectifier during startup.

Figure 4:
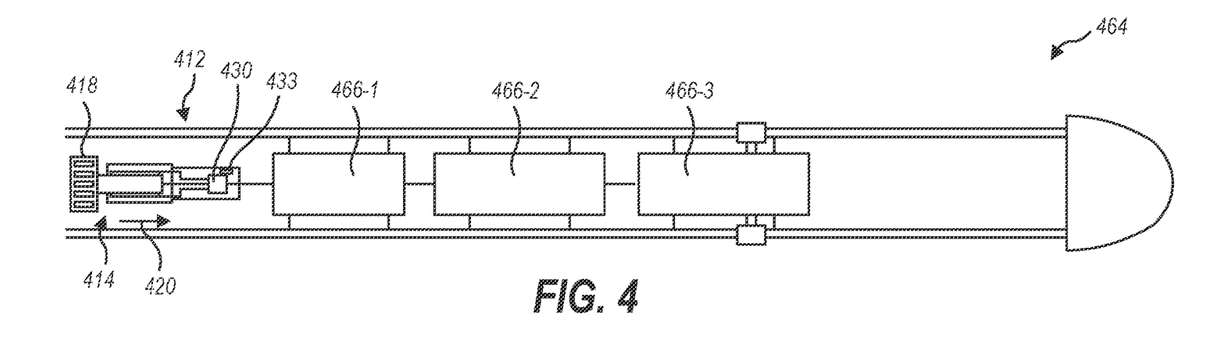
FIG. 4 is a representation of a downhole drilling system, according to at least one embodiment of the present disclosure.

FIG. 4 is a representation of a downhole drilling system 464 including a downhole power generation system 412, according to at least one embodiment of the present disclosure. In some embodiments, the downhole drilling system 464 may be a bottomhole assemble (BHA) or a portion of a BHA, such as the BHA 106 of FIG. 1. In some embodiments, the downhole power generation system 412 may generate power for one or more elements of the downhole drilling system 464. For example, the downhole drilling system 464 may include one or more downhole components (collectively 466), such as an MWD 466-1, a downhole survey sub 466-2, or a rotary steerable system (RSS) 466-3. However, it should be understood that the downhole drilling system 464 may include any downhole tool, including expandable tools, sensors, survey instruments, MWDs, LWDs, directional drilling systems, communication systems (such as mud pulse telemetry systems, electromagnetic communication systems, and so forth) any other downhole tool, and combinations thereof.

The downhole components 466 may include an electrically powered element, such as a sensor, a processor, a valve, any other electrically powered element, and combinations thereof. The electrically powered elements may be configured to operate using DC power. Furthermore, the electrically powered elements may optimally operate with a constant DC input voltage. However, the generator 414 may generate AC power having a voltage that varies based on a flow rate of a fluid flow 420. An active rectifier 430 may convert the AC input power to DC output power having a constant DC output voltage. The downhole power generation system 412 may transmit the DC output power to the downhole components 466, which may utilize the DC output power.

In some embodiments, the downhole power generation system 412 may be sensorless. Put another way, the downhole power generation system 412 may generate DC power output having a constant output DC voltage. This may allow the downhole power generation system 412 to generate power for the BHA without any active control system.

In some embodiments, the downhole power generation system 412 may include a controller 433 configured to control operation of the active rectifier 430. The controller 433 may be in communication with one or more sensors on the downhole power generation system 412, such as voltmeters/ammeters on the AC input power, rotational rate sensors on the impeller 418, flow meters of the fluid flow 420, any other sensor, and combinations thereof.

The controller 433 may further be in communication with other elements of the downhole drilling system 464. For example, the controller 433 may be in communication with the BHA, or with individual downhole components, such as the MWD 466-1, the survey sub 466-2, or the RSS 466-3. In some embodiments, the BHA may include a common bus along the BHA, and the controller 433 may be connected to the common bus. In some embodiments, the controller 433 may receive instructions from one or more elements of the BHA. For example, the MWD 466-1 may provide an instruction to the controller 433 to change the constant DC output voltage.

In some embodiments, the controller 433 may provide information to the BHA. For example, the controller 433 may provide information of the watts of DC power converted by the active rectifier 430 to the MWD 466-1. Using this wattage information, the MWD 466-1 may determine which electrically operated components to operate based on the available power. In some embodiments, based on the available DC power, the MWD may determine that the available DC power is insufficient to operate a desired combination of electronically powered elements. The MWD may communicate with a surface location to increase the flow rate of the fluid flow 420, which may increase the power generation. This may increase the responsiveness of the downhole power generation system 412.

In some embodiments, the downhole power generation system 412 may receive and interpret mud pulse telemetry information communicated by variations in the flow rate of the fluid flow 420. For example, the downhole power generation system 412 may include a sensor configured to measure the rotational rate of the impeller 418. Based on changes in periodic changes to the rotational rate of the impeller 418, the controller 433 may receive and decode a message encoded in the variations in flow rate of the fluid flow 420.

Figure 5:
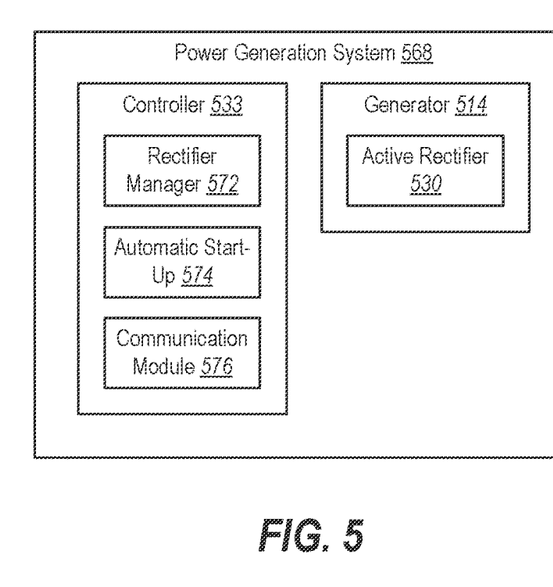
FIG. 5 is a representation of a downhole power generation system, according to at least one embodiment of the present disclosure.

FIG. 5 is a representation of a power generation system 568, according to at least one embodiment of the present disclosure. The power generation system 568 may include a generator 514. The generator 514 may generate AC input power which may be converted to DC output power using an active rectifier 530.

The power generation system 568 further includes a controller 533. The controller 533 may be in communication with the active rectifier. The controller 533 may include a rectifier manager 572. The rectifier manager 572 may be in communication with the active rectifier 530, and may be configured to control aspects of the active rectifier 530. For example, the rectifier manager 572 may open and close MOSFETs of the active rectifier 530 to maintain a constant DC output voltage. In some embodiments, the rectifier manager 572 may change aspects of the active rectifier 530 based on power generation information received by one or more sensors.

The controller 533 may further include an automatic startup manager 574. The automatic startup manager 574 may be in communication with the generator 514 to utilize power from the generator 514 as the turbine begins to rotate. The automatic startup manager 574 may include pathways in the active rectifier 530 that passively rectify low-voltage AC input power to low-voltage DC output power. The automatic startup manager 574 may then direct the low-voltage DC output power to the rectifier manager 572 so that the rectifier manager 572 may begin to manage the active rectifier 530. The automatic startup manager 574 may further direct DC output power to other elements of the power generation system 568 as additional power is generated during startup of the generator.

The controller 533 may further include a communication module 576. The communication module 576 may be configured to communicate with elements outside of the power generation system 568, such as a BHA. For example, the communication module 576 may provide the BHA with measurements from one or more sensors. The BHA may utilize the sensor measurements for any reason. For example, the BHA may direct power to different downhole elements based on the available output power. In some embodiments, the communication module 576 may receive information and/or instructions from the BHA. For example, the BHA may instruct the rectifier manager 572 to adjust the constant DC output voltage. In some embodiments, the communication module 576 may communicate with any other downhole drilling element. For example, the communication module 576 may communicate with the surface, such as through mud pulse telemetry.

Figure 6:
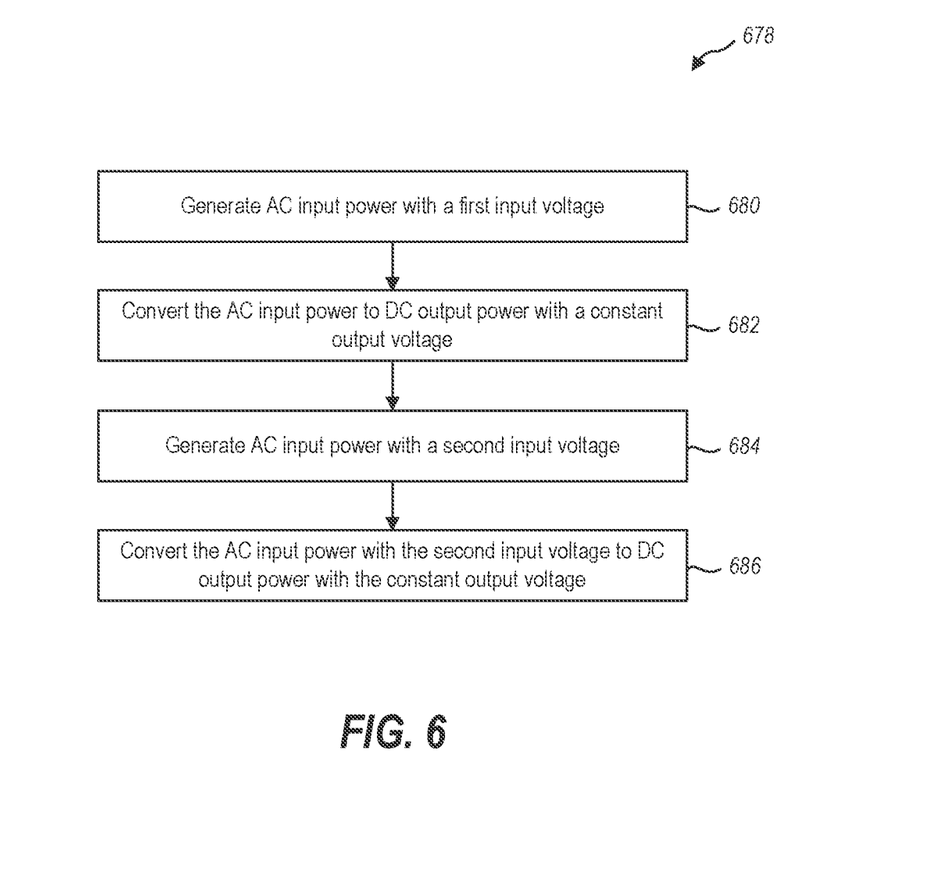
FIG. 6 is a representation of a method for generating downhole power, according to at least one embodiment of the present disclosure.

FIG. 6 is a representation of a method 678 for generating downhole power, according to at least one embodiment of the present disclosure. The method 678 includes generating AC input power that has a first input voltage at 680. The AC input power is generated using a generator. The generator includes a turbine rotated by a first fluid flow. The first fluid flow has a first flow rate. The rate of rotation of the turbine is based on the first flow rate, and the first input voltage is based on the rate of rotation of the turbine.

The AC input power with the first input voltage is converted to DC output power having a constant DC output voltage at 682. An active rectifier is used to convert the AC input power to the DC output power. The method 678 further includes generating AC input power to that has a second input voltage at 684. The second input voltage is different from the first input voltage, based on a second fluid flow having a second flow rate. During drilling operations, the fluid flow may vary, and therefore the AC input voltage may vary. The active rectifier may convert the AC input power having the second input voltage to DC output power having the constant output voltage at 686.

In some embodiments, the active rectifier may be controlled by a controller. The controller may determine that the first input voltage and the second input voltage are different. Determining that the first input voltage is different from the second input voltage may include sensing that the first input voltage is different from the second input voltage using a sensor, such as a sensor located at the generator. In some embodiments, the wattage of the DC output power may be different for the first AC input power and the second AC input power.

Figure 7:
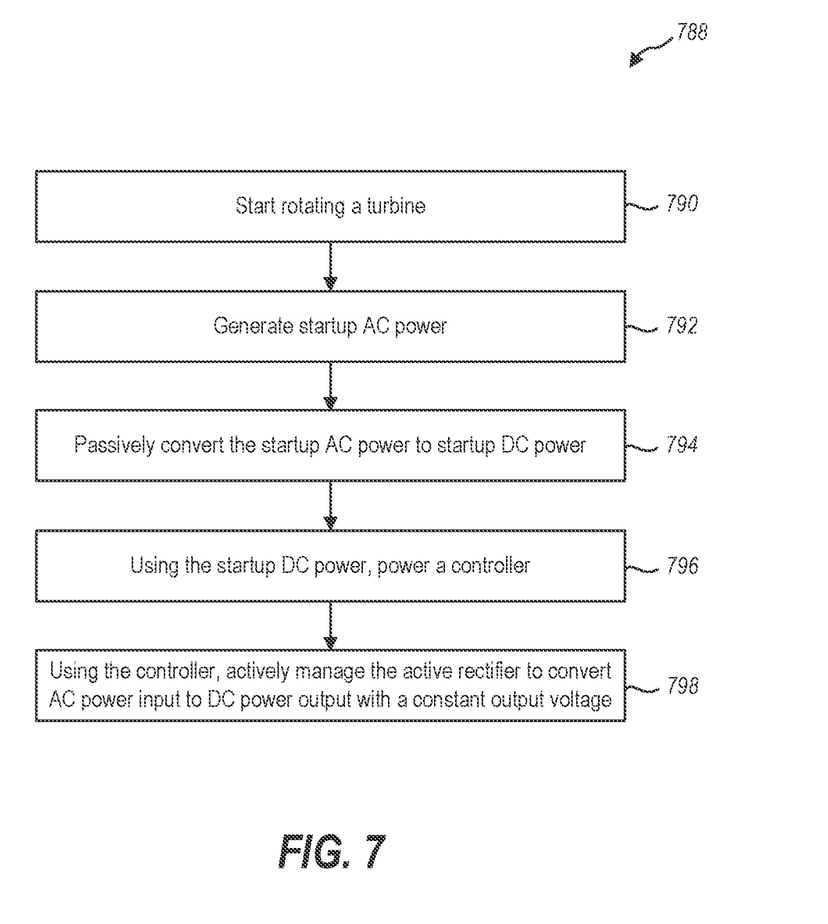
FIG. 7 is a representation of another method for generating downhole power, according to at least one embodiment of the present disclosure.

FIG. 7 is a representation of a method 788 for downhole power generation, according to at least one embodiment of the present disclosure. The method 788 may be implemented to automatically provide power to an automatic rectifier controller at startup. The method 788 may include starting to rotate a turbine at 790. For example, the turbine may be at rest (e.g., not rotating) or slowly rotating such that no power or a negligible amount of power is being generated by the generator. For example, prior to startup, drilling fluid may not be flowing through the downhole drilling system (e.g., a flow rate of the drilling fluid may be 0 or close to 0 GPM). Drilling fluid pumps may begin to pump drilling fluid through the downhole drilling fluid. The drilling fluid takes a startup period of time to increase the fluid flow to the operating level. During this time, the turbine may begin to rotate. During startup time, a startup AC input power may be generated having a low input voltage at 792. At low voltages, the active rectifier may be configured to act as a passive rectifier, such that the active rectifier may passively convert the startup AC input power to startup DC output power having a low DC output voltage. The startup DC output power may be directed to power up a controller of the active rectifier at 796. As the controller receives the startup DC power, the controller may begin to actively rectify the AC input power to DC output power having a constant DC output voltage. As the fluid flow varies, the AC input power may have a variable AC input voltage. The active rectifier may actively rectify the AC input power having the variable AC input voltage to DC output power having a constant DC output voltage at 798.

The embodiments of the downhole power generation system have been primarily described with reference to wellbore drilling operations; the downhole power generation systems described herein may be used in applications other than the drilling of a wellbore. In other embodiments, downhole power generation systems according to the present disclosure may be used outside a wellbore or other downhole environment used for the exploration or production of natural resources. For instance, downhole power generation systems of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein.

Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. Changes that come within the meaning and range of equivalency of the claims are to be embraced within their scope.

What is claimed is:

1. A downhole power generation system, comprising:
   a generator configured to generate alternating current (AC) input power having a variable input voltage from a variable fluid flow;
   an active rectifier configured to receive the AC input power having the variable input voltage and convert the AC input power to a direct current (DC) output power having a constant output voltage; and
   a controller including:
     a rectifier manager configured to control the active rectifier, the rectifier manager being initially dormant during a startup of the generator; and
     a startup manager configured to direct to the rectifier manager an initial DC output power generated by the active rectifier during the startup of the generator, the initial DC output power enabling the rectifier manager to begin controlling the active rectifier.

2. The system of claim 1, wherein the generator includes a single flow kit.

3. The system of claim 1, wherein the generator does not include a field coil to regulate the variable input voltage.

4. The system of claim 1, wherein the constant output voltage is greater than a maximum input voltage of the variable input voltage.

5. The system of claim 1, wherein the constant output voltage is approximately 10 times greater than a minimum input voltage of the variable input voltage.

6. The system of claim 1, further comprising:
   one or more sensors that sense the variable input voltage from the generator; and
   wherein the controller is configured to maintain the constant output voltage based on data from the one or more sensors.

7. The system of claim 1, wherein the startup manager is configured to direct DC output power to other elements of the downhole power generation system as additional power is generated during the startup of the generator.

8. A method for generating downhole power, comprising:
   generating an alternating current (AC) input power with a first input voltage using a generator of a power system, wherein the AC input power with the first input voltage is generated from a first fluid flow having a first flow rate;
   converting the AC input power with the first input voltage to a direct current (DC) output power with a constant output voltage using an active rectifier of the power system;
   generating the AC input power with a second input voltage different from the first input voltage, wherein the AC input power with the second input voltage is generated from a second fluid flow having a second flow rate; and
   converting the AC input power to the DC output power with the constant output voltage using the active rectifier;
   wherein the power system includes:
     a controller including:
       a rectifier manager configured to control the active rectifier, the rectifier manager being initially dormant during a startup of the generator; and
       a startup manager configured to direct to the rectifier manager an initial DC output power generated by the active rectifier during the startup of the generator, the initial DC output power enabling the rectifier manager to begin controlling the active rectifier.

9. The method of claim 8, wherein converting the AC input power with the second input voltage to the DC output power with the constant output voltage includes adjusting the active rectifier using the controller to maintain the constant output voltage.

10. The method of claim 8, further comprising:
    determining that the second input voltage is different from the first input voltage; and
    adjusting the active rectifier to maintain the constant output voltage.

11. The method of claim 10, wherein determining that the second input voltage is different from the first input voltage includes sensing the first input voltage and the second input voltage.

12. The method of claim 10, wherein determining that the second input voltage is different from the first input voltage includes sensing the first flow rate and the second flow rate.

13. The method of claim 12, wherein sensing the first flow rate and the second flow rate includes sensing a rotational rate of a turbine.

14. The method of claim 8, wherein the DC output power generated from the AC input power with the first input voltage is different from the DC output power generated from the AC input power with the second input voltage.

* * * * *